United States Patent
Munetomo et al.

(10) Patent No.: US 11,567,629 B2
(45) Date of Patent: Jan. 31, 2023

(54) SYSTEM AND IMAGE FORMING SYSTEM

(71) Applicant: SHARP KABUSHIKI KAISHA, Sakai (JP)

(72) Inventors: Hiroki Munetomo, Sakai (JP); Keiko Hirukawa, Sakai (JP); Yuuki Iwamoto, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/159,286

(22) Filed: Jan. 27, 2021

(65) Prior Publication Data
US 2021/0243314 A1 Aug. 5, 2021

(30) Foreign Application Priority Data

Jan. 30, 2020 (JP) .............................. JP2020-013994

(51) Int. Cl.
*G06F 3/04817* (2022.01)
*H04N 1/00* (2006.01)
*G06F 3/16* (2006.01)

(52) U.S. Cl.
CPC .......... *G06F 3/04817* (2013.01); *G06F 3/167* (2013.01); *H04N 1/00403* (2013.01); *H04N 1/00424* (2013.01)

(58) Field of Classification Search
CPC . G06F 3/167; G06F 3/04817; H04N 1/00403; H04N 1/00424
See application file for complete search history.

(56) References Cited

U.S. PATENT DOCUMENTS

| | | | | |
|---|---|---|---|---|
| 2001/0043234 A1* | 11/2001 | Kotamarti | ............... | G06F 9/451 715/746 |
| 2006/0206327 A1* | 9/2006 | Hennecke | ............... | G10L 15/26 704/E15.045 |
| 2007/0192696 A1* | 8/2007 | Um | ........................ | G06F 3/0482 715/713 |
| 2009/0253463 A1* | 10/2009 | Shin | .................. | H04M 1/72469 704/E15.001 |
| 2009/0282061 A1 | 11/2009 | Ha et al. | | |
| 2018/0249263 A1* | 8/2018 | Raz | ........................ | A61B 5/121 |
| 2018/0275950 A1* | 9/2018 | Takagi | .................. | A61M 21/00 |

FOREIGN PATENT DOCUMENTS

| | | |
|---|---|---|
| JP | 2000-181292 A | 6/2000 |
| JP | 2000-267837 A | 9/2000 |

* cited by examiner

*Primary Examiner* — Mong-Shune Chung
(74) *Attorney, Agent, or Firm* — ScienBiziP, P.C.

(57) ABSTRACT

A system including: a control device; a storage device that stores a file; a display device; and a voice device, wherein the control device displays a list of first identification display for specifying the file on the display device when voice of a command for displaying a list is input from a user via the voice device, the control device assigns an identification code to the file displayed in the list, and displays the identification code as second identification display, and the control device selects the file corresponding to the identification code when voice including the identification code is input from the user via the voice device.

8 Claims, 13 Drawing Sheets

SYSTEM AND IMAGE FORMING SYSTEM

This Nonprovisional application claims priority under 35 U.S.C. § 119(a) on Patent Application No. 2020-13994 filed in Japan on 30 Jan. 2020, the entire contents of which are hereby incorporated by reference.

BACKGROUND OF THE INVENTION

Field of the Invention

The present invention relates to a system and the like.

Description of the Background Art

Conventionally, a technology for operating a device by voice has been known. For example, there is proposed an image forming apparatus in which voice is registered in association with an image formation mode, input voice is compared with the already registered voice in a call mode, and a call in the image formation mode associated with the input voice is controlled on the basis of the comparison result. (see, for example, Japanese Unexamined Patent Application No. 2000-181292). In addition, there is proposed a human-machine interface device that displays, by characters, a key word to be uttered for voice recognition or a serial number for identification on or near an object that can be selected on a GUI (graphical user interface) screen. (See, for example, Japanese Unexamined Patent Application No. 2000-267837).

However, each of the technologies disclosed in Japanese Patent Unexamined Applications Nos. 2000-181292 and 2000-267837 are technologies for associating, with voice, a mode or a function that the device has in advance, and a case where a file that the device does not have in advance is selected is not considered. In addition, in a case where a user selects a file, how a user should utter a file name or filename extension, or how the device should output the file by voice is different depending on the user and the file. For example, in a case where a user utters a file name, there is a case where a base name of the file name (for example, a "Flower" part in the file name "Flower.jpg") is uttered as an English word, or uttered character by character. Also, there is a case where the filename extension (for example, a "jpg" part in the file name "Flower.jpg") is uttered character by character, or is called uniquely (for example, "txt" is "text", and "jpg" is "jay-peg"). Furthermore, it is conceivable that the user may say "dot" or "period" for "." which is a symbol that separates the base name and the filename extension. Thus, there are various ways in which the user can utter the file name. Similarly, various methods can be considered in a case where the device outputs the file name by voice. Thus, there are various possible voices that are exchanged between the user and the device in order to specify an arbitrary file by voice, and in particular, regarding the selection of the file, an interface that specializes for voice operation is not often considered.

In view of the aforementioned problems, an object of the present application is to provide a system and the like having an interface suitable for voice operation.

SUMMARY OF THE INVENTION

A first aspect for solving the aforementioned problems is a system including: a control device (for example, a control device 10 in FIG. 1 or a controller 600 in FIG. 4); a storage device (for example, a storage device 20 in FIG. 1 or a storage 650 in FIG. 4) that stores a file; a display (for example, a display 30 in FIG. 1 or a display 610 in FIG. 4), a voice device (for example, a voice input/output device 40 in FIG. 1 or a voice inputter/outputter 630 in FIG. 4), wherein the control device displays a list of first identification display for specifying the file on the display device when voice of a command for displaying a list is input from a user via the voice device, the control device assigns an identification code to the file displayed in the list, and displays the identification code as second identification display, and the control device selects the file corresponding to the identification code when voice including the identification code is input from the user via the voice device.

A second aspect is the system of the first aspect, in which when the control device displays the list of the first identification display on the display device, the control device receives input of the voice including the identification code from the user only in a case where the user is able to select the file from the first identification display displayed in the list.

A third aspect is the system of the first aspect, in which the control device is able to execute a predetermined process, the control device is able to display a list of the first identification display and the second identification display on the display device, when the predetermined process is executed, and the control device selects the file corresponding to the identification code, when the voice including the identification code is input from the user via the voice device while the predetermined process is being executed.

A fourth aspect is the system of the third aspect, in which the predetermined process is a conference process in which a plurality of users are able to participate.

A fifth aspect is the system of the first aspect, in which in a case where voice is input from the user via the voice device and a list is displayed, the control device receives input of the identification code from the voice device, and in a case where input is made from the user via a device other than the voice device and a list is displayed, the control device receives input from the device other than the voice device.

A sixth aspect is the system of the first aspect, in which the first identification display is an icon indicating a file name and an attribute of the file.

A seventh aspect is the system of the first aspect, in which the control device groups the files to be displayed in the list, and assigns one identification code to a plurality of the files included in the same group.

An eighth aspect is an image forming system including: a control device (for example, an image forming apparatus 70 in FIG. 8 or a controller 700 in FIG. 9); a storage device (for example, an image forming apparatus 70 in FIG. 8 or a storage 770 in FIG. 9) that stores a file; and a display device (for example, an image forming apparatus 70 in FIG. 8 or a display 750 in FIG. 9); and a voice device (for example, a voice input/output device 90 in FIG. 8 or a voice inputter/outputter 760 in FIG. 9), wherein the control device displays a list of a thumbnail image of the file on the display device, the control device superimposes an image including an identification code on the thumbnail image displayed in the list, and displays the superimposed images, and in a case where the identification code is input by voice from a user via the voice device, the control device forms an image on the basis of the file corresponding to the identification code.

A ninth aspect is the image forming system of the eighth aspect, in which the image including the identification code is an image whose size is one-third or more of at least a short side of the thumbnail image.

A tenth aspect is the image forming system of the eighth aspect, in which the image including the identification code is an image in which the identification code is included in a rectangular non-transparent image.

An eleventh aspect is the image forming system of the eighth aspect, in which the image including the identification code is an image superimposed and displayed on any corner of the thumbnail image.

A twelfth aspect is the image forming system of the eighth aspect, in which the control device sequentially selects one thumbnail image from the thumbnail images displayed in the list, and outputs the identification code corresponding to the selected thumbnail image by voice from the voice device.

A thirteenth aspect is the image forming system of the twelfth aspect, in which when the identification code corresponding to the selected thumbnail image is output by voice from the voice device, the control device highlights the thumbnail image together with the identification code.

A fourteenth aspect is the image forming system of the thirteenth aspect, in which the control device performs display, as the highlighting of the thumbnail image, by at least any one of methods of: enlarging and displaying the thumbnail image; displaying a frame around the thumbnail image; reversing and displaying color of the thumbnail image; and blinking and displaying the thumbnail image.

A fifteenth aspect is the image forming system of the twelfth aspect, in which when the identification code corresponding to the selected thumbnail image is output by voice from the voice device, the control device enlarges and displays the image including the identification code together with the identification code.

According to the present invention, an interface suitable for voice operation can be provided.

DESCRIPTION OF THE PREFERRED EMBODIMENTS

Hereinafter, embodiments of the present invention will be described with reference to the drawings. Each embodiment is described for convenience of describing the present invention, and the technical scope of the present invention is not limited to the following embodiments.

1. First Embodiment 1. 1 Overall Configuration

Figure 1:
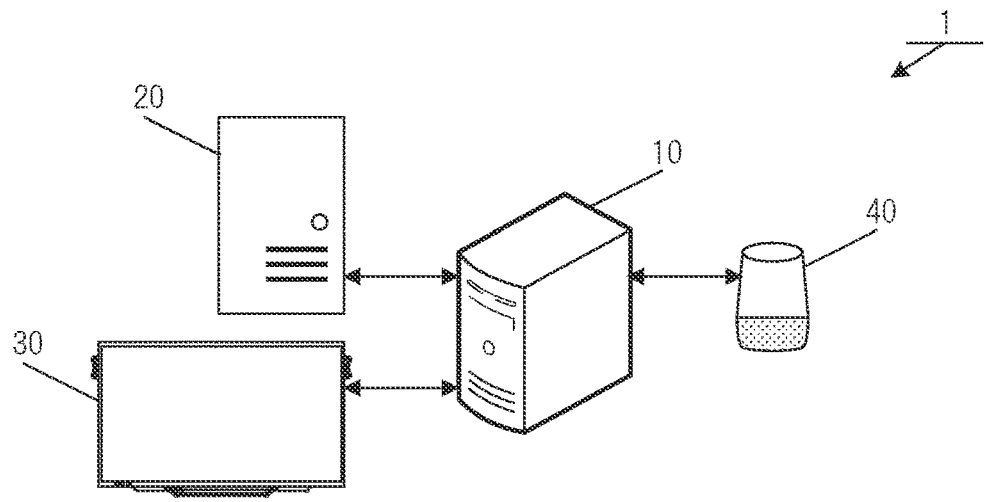
FIG. 1 is a diagram for illustrating an overall system in a first embodiment.

FIG. 1 is a diagram illustrating an outline of a system 1. The system 1 includes, for example, a control device 10, a storage device 20, a display device 30, and a voice input/output device 40.

Herein, the devices constituting the system 1 may be respective independent devices, may be configured in one device, or may be a combination of a plurality of devices.

Further, the voice input/output device 40 may use an external service. For example, the voice input/output device 40 recognizes a word from voice uttered by a user, and transmits the word as an input sentence to conversation service. In the conversation service, a corresponding response sentence (conversation sentence) is transmitted to the voice input/output device 40 on the basis of the received input sentence. The voice input/output device 40 outputs voice on the basis of the response sentence.

Herein, the conversation service is service of receiving input of a sentence or voice from a user, recognizing a request of the user from the input content, and outputting an execution result of a process for the request, a response sentence including information to be presented to the user, or response voice, as a response to the request. In addition, the conversation service establishes dialogue by continuously repeating such input from the user and response to the input.

The conversation service may be realized by the system 1 without using any external service. For example, by executing a program that realizes a conversation process in the control device 10, the conversation service can be provided to the user only by the system 1.

1. 2 Functional Configuration

Figure 2:
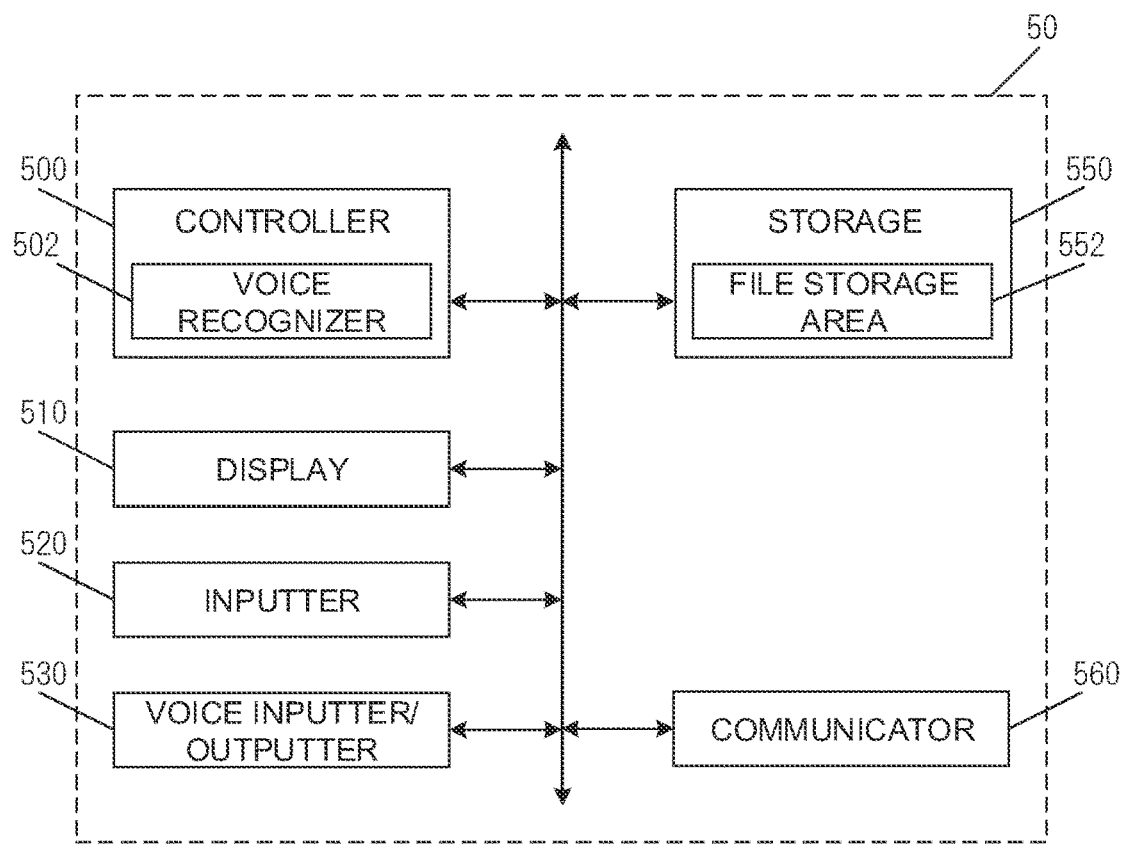
FIG. 2 is a diagram for illustrating a functional configuration of a processing device according to the first embodiment.

FIG. 2 is a diagram illustrating a configuration in a case where the system 1 is applied to a processing device 50. The processing device 50 includes a controller 500 corresponding to the control device 10, a storage 550 corresponding to the storage device 20, a display 510 corresponding to the display device 30, and a voice inputter/outputter 530 corresponding to the voice input/output device 40. The processing device 50 will be described below.

The controller 500 is a functional section for controlling the whole of the processing device 50. The controller 500 realizes various functions by reading and executing various programs stored in the storage 550, and is, for example, composed of one or a plurality of arithmetic devices (such as a central processing unit (CPU)).

The controller 500 functions as a voice recognizer 502 by executing the program. In a case where voice is input via the voice inputter/outputter 530, the voice recognizer 502 recognizes the input voice. The voice recognizer 502 may temporarily output information indicating the content of the recognized voice (for example, character information) to the storage 550.

The display 510 displays the content of a file, various states of the processing device 50, or the state of operation input. For example, the display 510 is composed of a liquid crystal display (LCD), an organic electroluminescent (EL) panel, electronic paper using electrophoresis, or the like.

The inputter 520 receives operation input from the user. For example, the inputter 520 is composed of a capacitance type touch panel or a pressure sensitive type touch panel. The inputter 520 may be a combination of a touch panel and an operation pen, or may be an input device such as a keyboard and a mouse, as long as the user can input information.

The voice inputter/outputter 530 inputs and outputs voice. For example, the voice inputter/outputter 530 is composed of a voice input device such as a microphone that inputs voice, and a voice output device such as a speaker that outputs voice. The voice inputter/outputter 530 may be an interface. For example, an external microphone or speaker, or the like may be connected to an interface. The voice inputter/outputter 530 may also be a device such as short-range wireless communication (for example, Bluetooth (registered trademark)) and a smart speaker.

The storage 550 is a functional section for storing various programs and various data required for the operation of the processing device 50. The storage 550 is composed of a storage device such as, for example, a solid-state drive (SSD), which is a semiconductor memory, a hard disc drive (HDD). In addition, the storage 550 secures a file storage area 552 for storing a file.

The communicator 560 communicates with other devices. For example, the communicator 560 is connected to a local area network (LAN) to transmit and receive information related to comments with other devices, or transmit and receive documents. In addition to the LAN, which is a general Ethernet (registered trademark), communication such as LTE/4G/5G may be used as a communication method.

1. 3 Flow of Process

Figure 3:
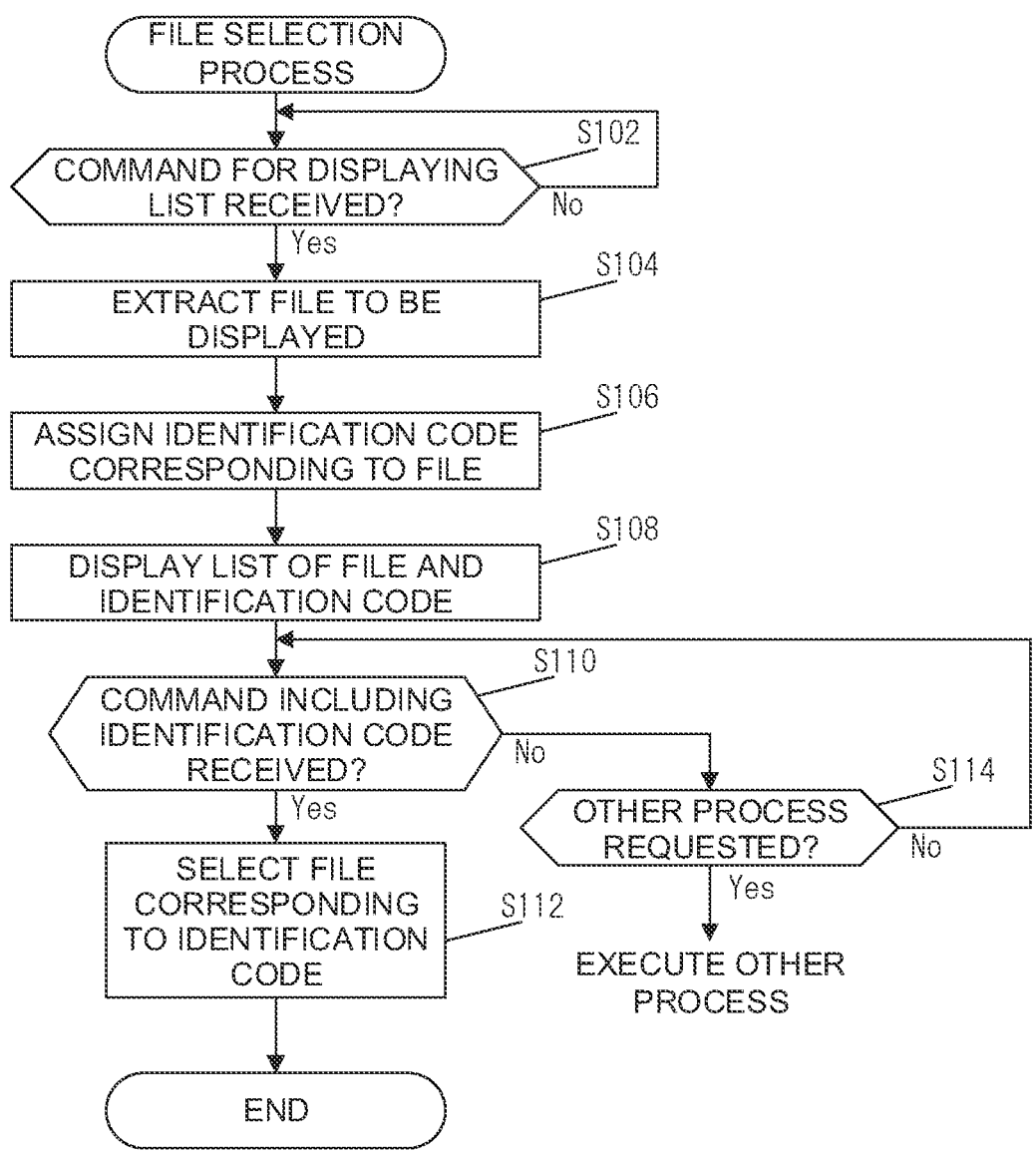
FIG. 3 is a diagram for illustrating a file selection process in the first embodiment.

The flow of a file selection process executed by the processing device 50 will be described with reference to a flow diagram of FIG. 3. The file selection process is a process of selecting one file from files stored in the file storage area 552 on the basis of input voice. Assuming that the files are stored in the file storage area 552 in advance, the description will be made.

First, the controller 500 determines whether or not a command for displaying a list is received (Step S102). The command for displaying a list is, for example, voice indicating a request to display the files stored in the file storage area 552 in a list on the display 510. The command is, for example, voice such as "Display file", "Open folder", and "Open document". The controller 500 determines whether or not the command for displaying a list is received on the basis of the content of the voice input via the voice inputter/outputter 530 and recognized by the voice recognizer 502.

Specifically, the storage 550 stores in advance information (keyword) indicating, with characters, the content to be uttered by the user when the list of the files is displayed. Then, the controller 500 determines that the command for displaying a list is received in a case where the character information indicating the content of the voice recognized by the voice recognizer 502 matches the keyword.

In a case where the command for displaying a list is received, the controller 500 extracts the file to be displayed on the display 510 from the file storage area 552 (Yes in Step S102, Step S104). The controller 500 may extract all the files stored in the file storage area 552, may extract the file stored in a predetermined folder, or may extract the file that satisfy a predetermined condition (for example, the file whose date and time is today).

Subsequently, the controller 500 assigns an identification code corresponding to the extracted file (Step S106). The identification code is a number that can uniquely specify the file, for example, a serial number (number). The identification code may be an alphabet, for example, as long as the file can be uniquely specified.

Subsequently, the controller 500 displays a list of each file and the identification code on the display 510 (Step S108). Specifically, the controller 500 displays, on the display 510, first identification display for specifying the file and second identification display for indicating the identification code assigned to the file side by side for each file. The controller 500 displays each first identification display side by side on the display 510, and then displays the second identification display corresponding to each first identification display around the first identification display. Thus, the first identification display and the second identification display are displayed on the basis of a predetermined method, so that the user can grasp the correspondence between each file and the identification code assigned to the file by looking at the display 510.

The controller 500 displays, for example, a file name and the attributes of the file (for example, a type of the file, a creator of the file, a creation date of the file, and the like) as the first identification display. The controller 500 may display the attributes of the file by an icon, a picture, a symbol, or the like. In addition, the controller 500 displays, for example, a rectangle including an identification code as the second identification display in the vicinity of the corresponding file.

Subsequently, the controller 500 determines whether or not a command including an identification code is received (Step S110). The command including an identification code is at least voice including a content indicating an identification code, for example, voice such as "five" and "Number five". The command including an identification code may include the content indicating a process for the file. For example, the command including an identification code may be voice such as "Open number five" and "Open fifth document" including the content of the process of "open" as the process for the file.

Specifically, in a case where the content of the voice recognized by the voice recognizer 502 includes a way of calling a number indicating any of the identification codes displayed as the second identification display, the controller 500 determines that the command including the identification code is received.

In a case where the command including an identification code is received, the controller 500 selects a file corresponding to the identification code included in the received command (Yes in Step S110, Step S112).

In a case where the command including an identification code is not received and the user designates to execute other process, the controller 500 executes the designated process (No in Step S110, Step S114; Yes).

In a case where the command including an identification code is not received and any process is not designated by the user, the controller 100 again transitions the process to Step S110 (No in Step S114, Step S110).

As described above, according to this embodiment, the processing device assigns the identification code to the file and displays the assigned identification code together with the information for specifying the file. Therefore, the user can easily select the file simply by uttering voice including the identification code assigned to the file. The file can be selected simply by uttering the voice including the identification code, and therefore the user can properly select the file by the identification code without considering how to utter a file name or a filename extension included in the file name.

2. Second Embodiment

Figure 4:
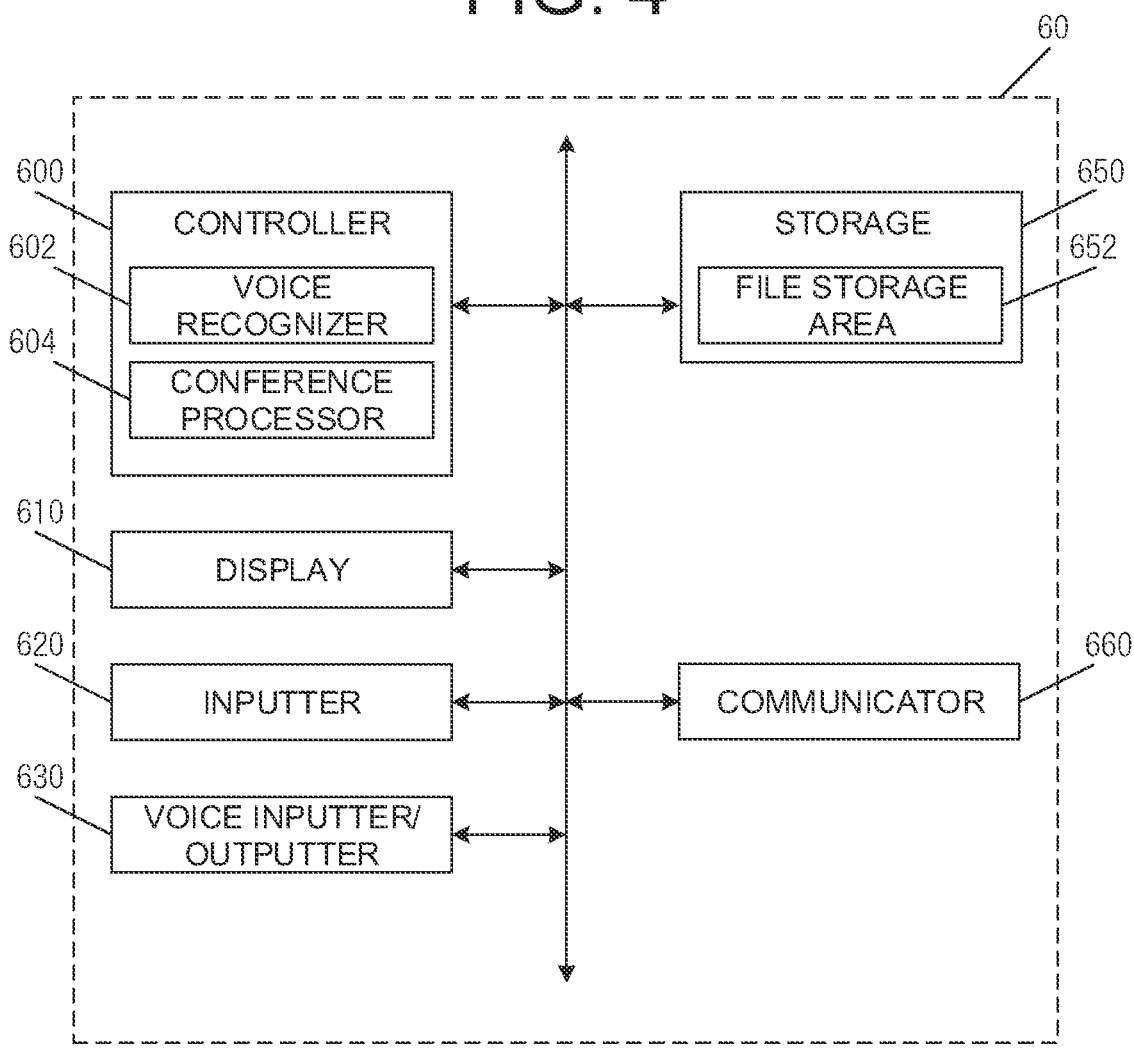
FIG. 4 is a diagram for illustrating a functional configuration of a display device in a second embodiment.

A second embodiment will be described. The second embodiment is an embodiment to which a system 1 is applied as a conference system. FIG. 4 is a diagram illustrating a display device 60 capable of providing a conference system. The display device 60 includes a controller 600 corresponding to the control device 10, a storage 650 corresponding to the storage device 20, a display 610 corresponding to the display device 30, and a voice inputter/outputter 630 corresponding to the voice input/output device 40. The display device 60 is, for example, a display device such as an interactive whiteboard (IWB) installed in a conference room. The display device 60 may be a terminal device used by a user.

The controller 600 is a functional section for controlling the whole of the display device 60. The controller 600 realizes various functions by reading and executing various programs stored in the storage 650, and is, for example, composed of one or a plurality of arithmetic devices (such as a CPU).

The controller 600 functions as a voice recognizer 602 and a conference processor 604 by executing a program. In a case where voice is input via the voice inputter/outputter 630, the voice recognizer 602 recognizes the input voice. The voice recognizer 602 may temporarily output information (for example, character information) indicating the content of the recognized voice to the storage 650.

The conference processor 604 executes a process (conference process) related to a conference in which a plurality of users can participate, in order to support the progress of the conference. The conference processor 604 executes, for example, a process of providing a chat function performed by a plurality of users who participate in a conference, as a conference process. In addition, the conference processor 604 performs a process of transmitting and receiving files between devices (for example, respective terminal devices used by a plurality of users who participate a conference) connected to the display device 60, as the conference process.

The display 610 displays the content of a file, various states of the display device 60, the state of operation input, and the like. For example, the display 610 is composed of, for example, a liquid crystal display, an organic electroluminescent (EL) panel, electronic paper using electrophoresis, or the like.

The inputter 620 receives operation input from the user. For example, the inputter 520 is composed of a capacitance type touch panel or a pressure sensitive type touch panel. The inputter 620 may be a combination of a touch panel and an operation pen, or may be an input device such as a keyboard and a mouse, as long as the user can input information.

The voice inputter/outputter 630 inputs and outputs voice. For example, the voice inputter/outputter 530 is composed of a voice input device such as a microphone that inputs voice, and a voice output device such as a speaker that outputs voice. The voice inputter/outputter 630 may be an interface. For example, an external microphone or speaker, or the like may be connected to an interface. The voice inputter/outputter 630 may also be a device such as short-range wireless communication (for example, Bluetooth) and a smart speaker.

The storage 650 is a functional section for storing various programs and various data required for the operation of the display device 60. The storage 650 is composed of, for example, an SSD, which is a semiconductor memory, an HDD, or the like. In addition, the storage 650 secures a file storage area 652 for storing a file.

The communicator 660 communicates with other devices. For example, the communicator 660 is connected to a LAN to transmit and receive information related to a conference with another device, or transmit and receive files. In addition to the LAN, which is a general Ethernet, communication such as LTE/4G/5G may be used as a communication method.

Figure 5:
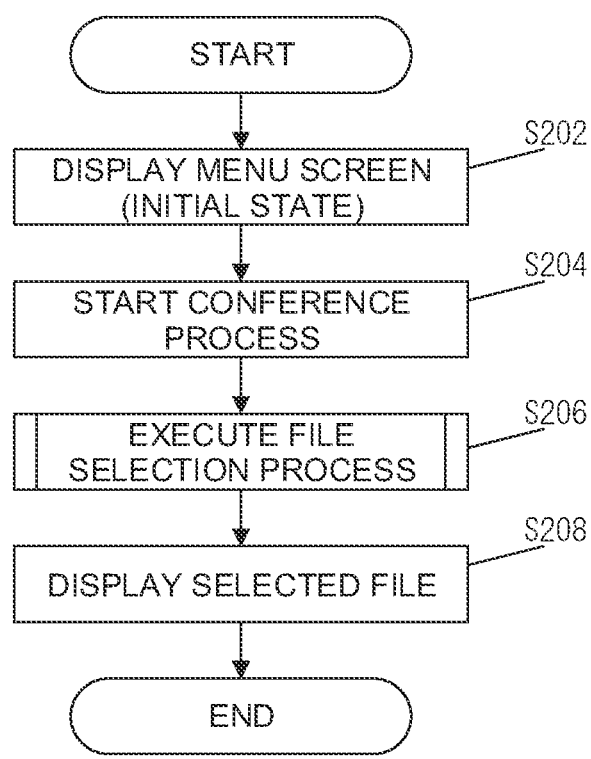
FIG. 5 is a diagram for illustrating a process of the display device in the second embodiment.

Next, a process executed by the display device 60 will be described with reference to FIG. 5. First, the controller 600 displays a menu screen on the display 610 as an initial state (Step S202). The menu screen displays, for example, information on one or a plurality of conferences and files related to the conference. For example, the controller 600 acquires conference information from a device that manages the conference information (such as a conference name, names of users who participate in the conference, start time, end time, and a file name of a file related to the conference) via the communicator 660, and displays the acquired conference information on the display 610. The file related to the conference is, for example, a file designated when the conference information is registered by a user, or a filed attached to a conference invitation email transmitted in advance to the user who is a participant of the conference.

When the menu screen is displayed, the conference is not yet started and the conference process is not yet executed. Therefore, the controller 600 prevents the user from selecting the file related to the conference displayed on the menu screen. Specifically, the controller 600 does not assign an identification code to the file, and does not display second identification display. In addition, even when voice (command) including an identification code is input from the user, the controller 600 does not receive the input of the voice.

Subsequently, the controller 600 (conference processor 604) starts the conference by starting the conference process on the basis of the operation of starting the conference by the user (Step S204). At this time, for example, the controller 600 acquires the file related to the started conference and stores the acquired file in the file storage area 652. Further, the controller 600 (conference processor 604) may receive the file from a terminal device used by the user who participates in the conference, and store the received file in the file storage area 652, in the conference process.

Subsequently, the controller 600 executes a file selection process (Step S206). The file selection process is the same process as the file selection process described in the first embodiment. For example, the controller 600 recognizes the voice input via the voice inputter/outputter 630 by the voice recognizer 602, and determines whether or not a command of list display is received. In a case where the command of list display is received, the controller 600 assigns an identification code to the file stored in the file storage area 652, and performs first identification display and second identification display. Thus, the controller 600 displays a list of the first identification display and the second identification display on the display 610 when the conference process is executed. Further, when voice including an identification code is input from the user who is a participant of the conference via the voice inputter/outputter 630, the controller 600 selects a file corresponding to the input identification code. Thus, the controller 600 displays the first identification display and the second identification display on the display 610 only during the execution of the conference process in which the user can select the file. In addition, the controller 600 selects the file corresponding to the identification code when the voice (command) including the identification code is input from the user only during the execution of the conference process in which the user can select the file.

Subsequently, the controller 600 displays the file selected by the file selection process on the display 610 (Step S208). For example, the controller 600 activates an application capable of displaying the selected file, and displays the file selected by the user by performing a display process via the application.

Figure 6:
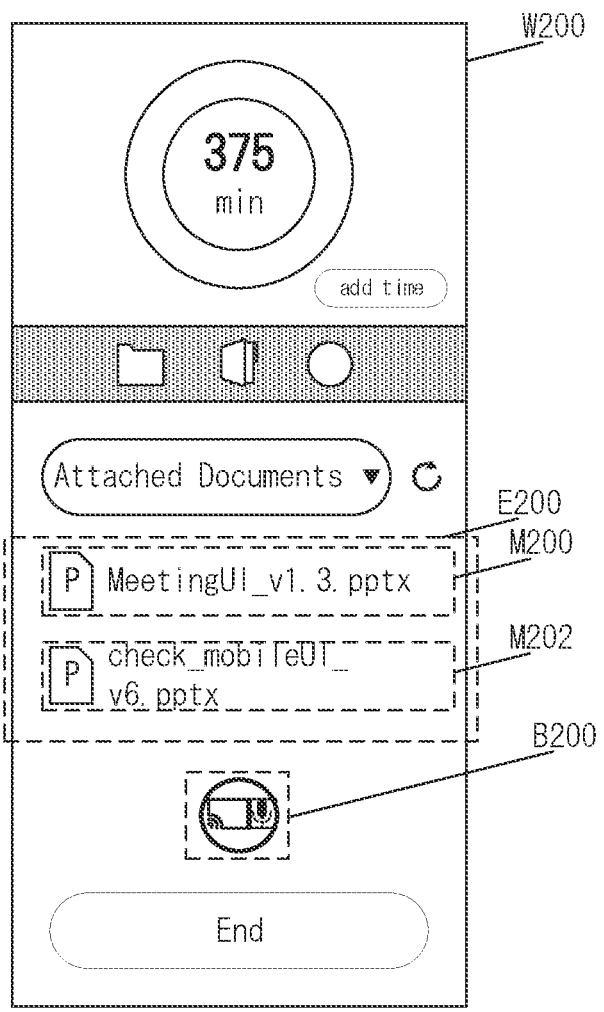
FIG. 6 is a diagram for illustrating an operation example in the second embodiment.

Next, an operation example of this embodiment will be described with reference to FIGS. 6 and 7. FIG. 6 is an example of a display screen W200 illustrating the menu screen. The display screen W200 is displayed on the display 610 or displayed on the terminal device used by the user. The display screen 200 includes an area E200 for displaying files related to the conference. The area E200 includes, for example, display M200 and display M202 as the first identification display. As the display M200, a file name for specifying one file (for example, "ConferenceUI_v1.3.pptx") and an icon indicating a file type that is the attribute of the one file are displayed. Similarly, as the display M202, a file name for specifying one file (for example, "check_mobileUI_v6.pptx") and an icon indicating a file type that is the attribute of the one file are displayed. At this point, the conference is not yet started, so the file is not selected on the basis of the operation by the user. In addition, the second identification display is not displayed in the area E200. Therefore, the display device 60 does not receive the input of the voice (command) including an identification code.

Figure 7A:
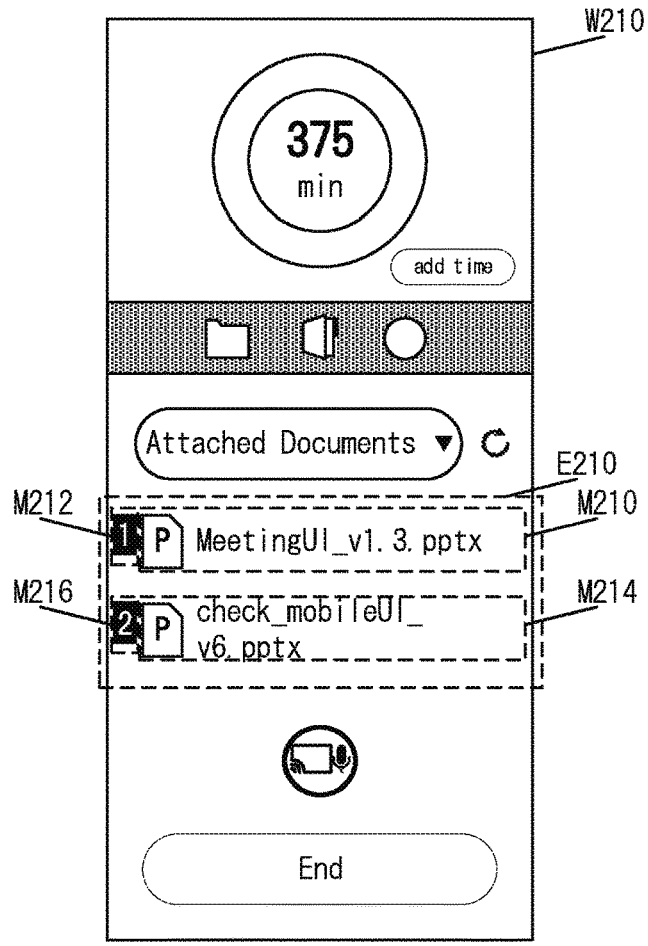
FIGS. 7A and 7B is a diagram for illustrating an operation example in the second embodiment.

FIG. 7A is an example of a display screen W210 displayed on the display 610 and the terminal device used by the user after the conference process is started. The display screen 210 is a screen on which a file can be selected on the basis of the input by the user. The display screen 210 includes an area E210 for displaying files related to the conference. In addition, the area E210 includes an area for displaying the first identification display and an area for displaying the second identification display for each file, and the first identification display and the second identification display are displayed vertically in a row. Therefore, the user can select the file from the first identification display displayed in the list. In addition, the display device 60 receives input of voice (command) input including an identification code.

In the display device 60, the file selection based on the operation by the use may be performed, for example, after start of a process related to a function for recognizing the voice of the user and controlling the display device 60 (voice recognition control), in addition to the conference process. For example, a voice switch icon B200 illustrated in FIG. 6 is a button that enables voice recognition control by being selected by the user. The display device 60 may start a function related to voice recognition control on the basis of the selection of the voice switch icon B200 in FIG. 6, and add and display the second identification display as illustrated in the display screen W210 illustrated in FIG. 7A.

As illustrated in FIG. 7A, for example, the area E210 includes display M210 which is first identification display and display M212 which is second identification display, and the second identification display M212 is displayed to the left of the first identification display M210. Display M210 is the same as the display M200 in FIG. 6. In addition, a rectangle including "1" which is an identification code is displayed as the display M212. Such display indicates that the file with the file name "ConferenceUI_v1. 3. pptx" corresponds to the identification code "1".

Similarly, the area E210 includes display M214 which is first identification display and display M216 which is second identification display, and the second identification display M216 is displayed to the left of the first identification display M214. The display M214 is the same as the display M202 in FIG. 6. In addition, a rectangle including "2" which is an identification code is displayed as the display M216. Such display indicates that the file with the file name "check_mobileUI_v6. pptx" corresponds to the identification code "2".

The user can select the file corresponding to the identification code by inputting the voice including "1" or "2" which is the identification code which is displayed on the display screen W210.

Figure 7B:
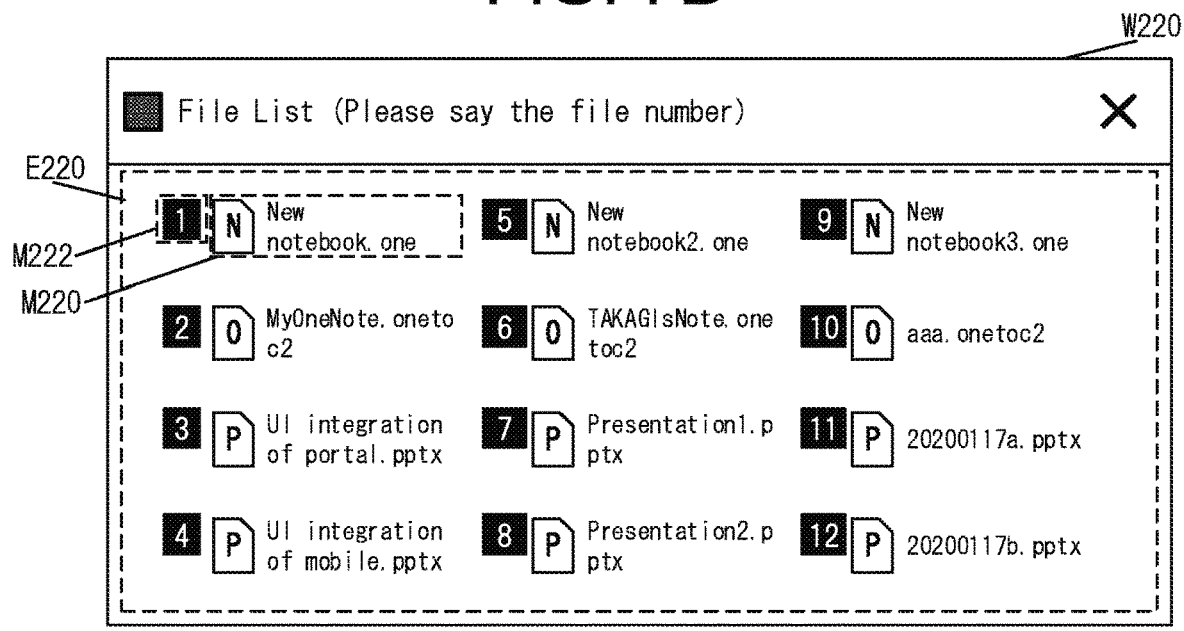

A screen on which the file can be selected on the basis of the input by the user may be other than the display screen W210 illustrated in FIG. 7A, for example, a display screen W220 illustrated in FIG. 7B. The display screen W220 includes an area E220 in which the first identification display and the second identification display are arranged and displayed in a plurality of rows unlike the display screen W210 on which the first identification display and the second identification display are vertically arranged and displayed in one row.

In the area E220, as illustrated in FIG. 7B, the first identification display and the second identification display are displayed for each file. For example, the area E220 includes display M220 which is first identification display and display M222 which is second identification display. As the display M220, a file name for specifying one file (for example, "New notebook. one") and an icon indicating a file type that is the attribute of the one file are displayed. In addition, a rectangle including "1" which is an identification code is displayed as the display M222. In this case, the file with the file name "New notebook. one" corresponds to the identification code "1".

In addition, as illustrated in FIG. 7B, the display screen W220 displays "1" to "12" as identification codes. Therefore, the user can select the file corresponding to the identification code by inputting the voice including any number from "1" to "12" which are the identification codes.

In a case where the number of files displayed on the display 610 and the terminal devices used by the users exceeds a predetermined value (for example, 12 in the case of FIG. 7B), the area including the first identification display and the second identification display may be scrollable. When the scroll operation by the user is performed, the display device 60 reassigns the identification code from 1 to the file to be displayed in the area including the first identification display and the second identification display, and then updates the first identification display and the second identification display. Consequently, even in a case where the number of files is large, a number equal to or less than the predetermined value is displayed as the second identification display. Therefore, even in a case where the number of files stored in the file storage area 652 is large, the user can select a file by uttering any number up to the predetermined value. For example, in the example illustrated in FIG. 7B, the user only needs to utter any number of 1 to 12.

In addition, the display device 60 may group files and assign one identification code to a plurality of files included in the same group. When the files are grouped, the display device 60 uses attributes such as a date such as a creation date and an update date, a creator, a file format, and a frequency of use. Consequently, the user can input a command including one identification code to display a plurality of files corresponding to the input identification code on the display device 60. Thus, in the display device 60, it is possible to improve the convenience of the user by displaying a plurality of files by one command.

According to this embodiment, the user can select and display a file to be displayed on the display by a simple operation of inputting the command including an identification code by voice.

3. Third Embodiment

A third embodiment is an embodiment in which command input is received from a device other than a voice device in addition to the processes described in the first embodiment or the second embodiment.

First, a case where this embodiment is applied to the conference system described in the second embodiment will be described. In this case, the controller 500 receives either a command by voice or a command operated by the inputter 620 as a command for displaying a list, in Step S102 of the file selection process. The case where the command by the operation by the inputter 620 is received is, for example, a case where the controller 600 displays a button for displaying the list on the display 610 and a user selects the button for displaying the list.

In a case where a voice command is input in Step S102, the controller 600 determines whether or not the command including an identification code is input via the voice inputter/outputter 630, in Step S110. In this case, even when the command including an identification code via the inputter 620, such as operation of touching the second identification display or operation of selecting a button having a number corresponding to second identification display is input, the controller 600 ignores the command input via the inputter 620.

On the other hand, in a case where the command by the operation by the inputter 620 is input in the Step S102, the controller 600 determines whether or not the command including an identification code is input via the inputter 620. In this case, even when the command including an identification code is input via the voice inputter/outputter 630, the controller 600 ignores the command input via the voice inputter/outputter 630.

By such a process, the controller 600 receives the input of the command including an identification code on the basis of a functional section input as a command for displaying a list.

In a case where this embodiment is applied to the system 1 of the first embodiment, an input device that receives input of operation from a user by a method other than voice is connected to the control device 10 in the system 1. When the control device 10 receives the command for displaying a list from the input device, the control device 10 receives the command including an identification code from the input device and does not receive the command including an identification code from the voice input/output device 40. On the other hand, when the control device 10 receives the command for displaying a list from the voice input/output device 40, the control device 10 receives the command including an identification code from the voice input/output device 40 and does not receive the command including an identification code from the input device.

As described above, according to this embodiment, the user can unify the operation of inputting the command for displaying a list and the operation of inputting the command including an identification code into only the voice operation or only the input operation to the input device, and continuously perform the operation. Moreover, it is possible to prevent the file from being selected due to unintended operation.

4. Fourth Embodiment

A fourth embodiment will be described. The fourth embodiment is an embodiment in which the system 1 is applied as a print system.

4. 1 Overall Configuration

Figure 8:
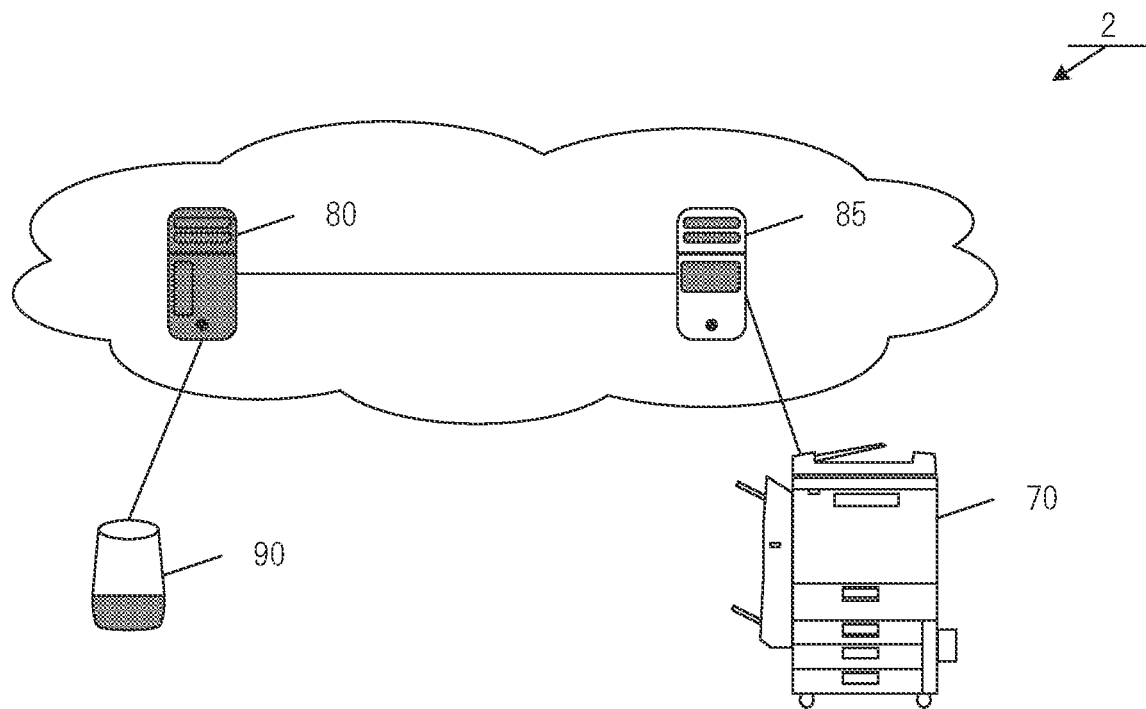
FIG. 8 is a diagram for illustrating an overall print system in a fourth embodiment.

FIG. 8 is a diagram illustrating an outline of a print system 2 to which the system 1 is applied. The print system 2 includes, for example, an image forming apparatus 70, a voice processing device 80, a dialogue device 85, and a voice input/output device 90. In addition, the image forming apparatus 70 and the dialogue device 85 are connected each other, the voice processing device 80 and the dialogue device 85 are connected each other, and the voice processing device 80 and the voice input/output device 90 are connected each other. The image forming apparatus 70 and the voice input/output device 90 may be installed at a place where a user is located, and the voice processing device 80 and the dialogue device 85 may be installed on the Internet (on the cloud).

The devices constituting the print system 2 may be respective independent devices, may be configured in one device, or may be a combination of a plurality of devices.

In the print system 2, the control device 10, the storage device 20, and the display device 30 of the system 1 are composed of the image forming apparatus 70. The voice input/output device 40 of the system 1 is composed of the voice processing device 80, the dialogue device 85, and the voice input/output device 90.

Specifically, in the print system 2 illustrated in FIG. 8, the voice input/output device 90 inputs voice uttered by a user, and transmits a voice stream to the voice processing device 80. The voice processing device 80 recognizes the input voice stream and transmits the recognized input voice stream as an input sentence to the dialogue device 85. The dialogue device 85 is a device that provides conversation service and generates a response sentence to the input sentence. The dialogue device 85 transmits/receives information to/from the image forming apparatus 70, acquires a state of the image forming apparatus 70, and generates, for example, a response sentence indicating the state of the image forming apparatus 70 to the input sentence, and transmits the generated response sentence to the voice processing device 80. The voice processing device 80 that receives the response sentence generates a voice stream for outputting the response sentence as voice, and transmits the generated voice stream to the voice input/output device 90. The voice input/output device 90 that receives the voice stream outputs voice on the basis of the received voice stream.

4. 2 Functional Configuration

In the following, a case where the print system 2 illustrated in FIG. 8 is configured by the image forming apparatus 70 will be described. In this case, the image forming apparatus 70 includes functional sections corresponding to the voice processing device 80, the dialogue device 85, and the voice input/output device 90, which are illustrated in FIG. 8.

Figure 9:
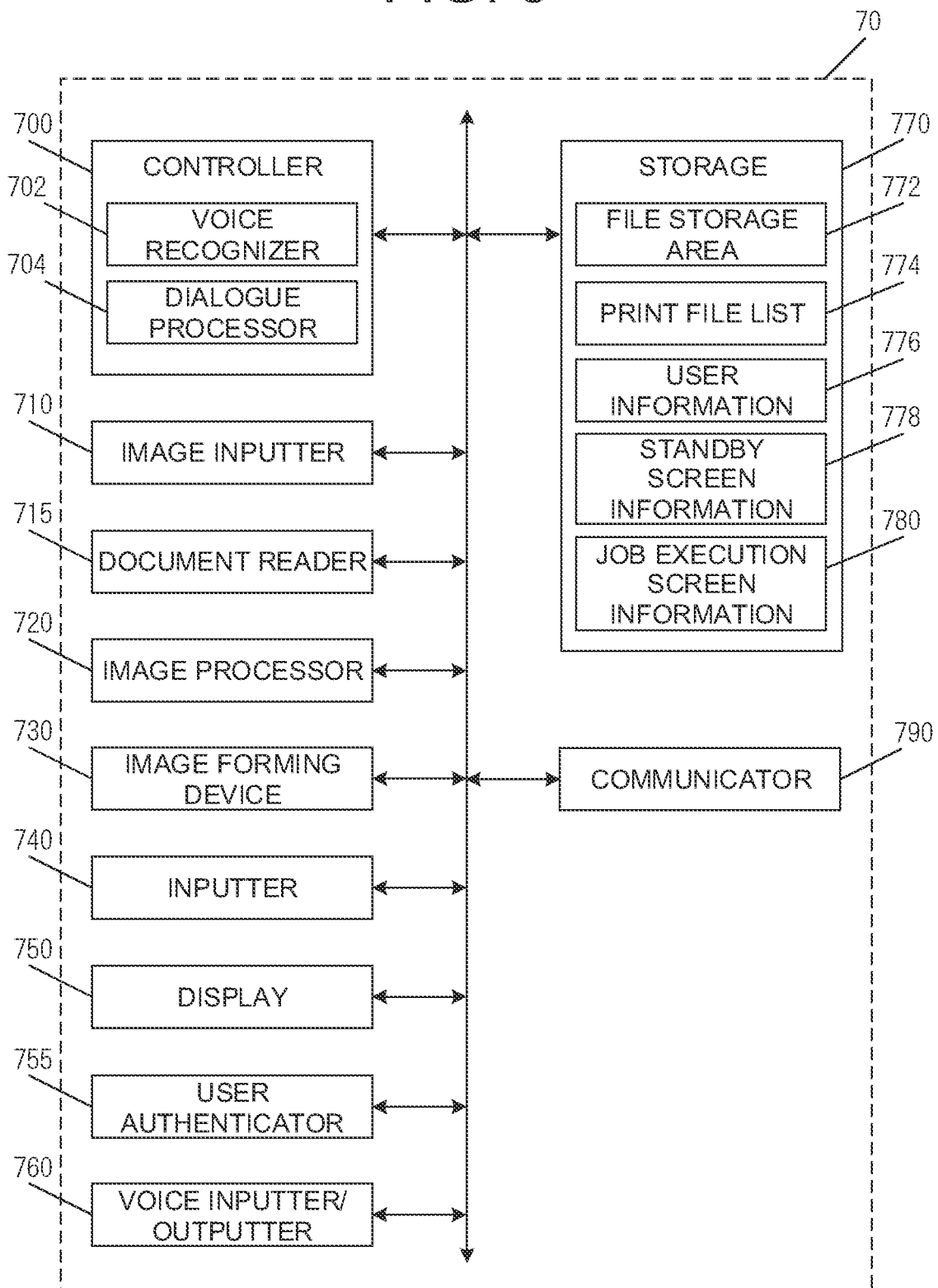
FIG. 9 is a diagram for illustrating a functional configuration of an image forming apparatus in the fourth embodiment.

FIG. 9 is a diagram illustrating the image forming apparatus 70 capable of providing the print system 2. The image forming apparatus 70 includes a controller 700 corresponding to the control device 10, a storage 770 corresponding to the storage device 20, a display 750 corresponding to the display device 30, and a voice inputter/outputter 760 corresponding to the voice input/output device 40.

The controller 700 is a functional section for controlling the whole of the image forming apparatus 70. The controller 700 realizes various functions by reading and executing various programs stored in the storage 770, and is composed of one or a plurality of arithmetic devices (for example, a CPU).

The controller 700 functions as a voice recognizer 702 and an dialogue processor 704 by executing a program. In a case where voice is input via the voice inputter/outputter 760, the voice recognizer 702 recognizes the input voice. The voice recognizer 702 may temporarily output information indicating the content of the recognized voice (for example, character information) to the storage 770.

The dialogue processor 704 realizes conversation service. The dialogue processor 704 outputs a response sentence corresponding to the input voice via the voice inputter/outputter 760.

An image inputter 710 is a functional section for acquiring image data to be input to the image forming apparatus 70. Also, the image inputter 710 may acquire the image data from a storage medium such as a universal serial bus (USB) memory or an SD card. Moreover, the image inputter 710 may acquire the image data from another terminal device via a communicator 790 which connects the image inputter to the other terminal device. In addition, the image inputter 710 stores the acquired image data as a file in a file storage area 772.

A document reader 715 is a functional section that reads an image and generates image data. For example, the document reader 715 is composed of a scanner device that generates digital data by converting an image into an electric signal by an image sensor such as a CCD (Charge Coupled Device) or a CIS (Contact Image Sensor), and quantizing and encoding the electric signal. Further, the document reader 715 stores the generated image data as a file in the file storage area 772.

The image processor 720 is a functional section which performs various image processes to the image data. For example, the image processor 720 performs a sharpening process of image data, or performs a color conversion process.

The image former 730 is a functional section that forms an image based on a file on a recording medium (for example, recording paper). The image former 730 includes, for example, an electrophotographic laser printer.

The inputter 740 is a functional section for receiving an operation instruction by a user, and is composed of a hardware key (for example, a numeric keypad), a button, and the like. The display 750 is a functional section for displaying various information to a user, and is composed of, for example, a display such as an LCD and an organic EL display. The image forming apparatus 70 may include a touch panel in which the inputter 740 and the display 750 are integrally formed. A method of detecting input may be a common detection method such as a resistive film type, an infrared type, an electromagnetic induction type, and a capacitive type.

A user authenticator 755 performs user authentication. For example, authentication is performed on the basis of whether or not a user name and a password input from the inputter 740 match a user name and a password stored in user information 776. In addition, the user authenticator 755 may acquire bio-information and an image of a user, and perform biometric authentication (for example, fingerprint authentication, palm print authentication, face authentication, voice authentication, iris authentication, or the like).

The voice inputter/outputter 760 performs voice input and voice output. For example, the voice inputter/outputter 530 is composed of a voice input device such as a microphone that inputs voice, and a voice output device such as a speaker that outputs voice.

The storage 770 is a functional section that stores various programs and various data necessary for the operation of the image forming apparatus 70. The storage 770 is composed of a storage device such as an SSD, which is a semiconductor memory, or an HDD. In addition, the storage 770 secures the file storage area 772 for storing a file, and stores a print file list 774, the user information 776, standby screen information 778, and job execution screen information 780.

The print file list 774 is a list that stores information (for example, a file name) that specifies a file of an image formed in the image former 730 among the files stored in the file storage area 772. The print file list 774 may store a print order, priority, print setting, a name of a user who performs print operation, and the like, in addition to the information for specifying a file.

The user information 776 stores information about a user. For example, the user information 776 stores information about user authentication (for example, a user name, a password, bio-information about a user).

The standby screen information 778 stores information necessary to display a standby screen waiting for command input on the display 750 (for example, a character string and an icon to be displayed on the display 750, and information of positions where the character string and the icon are disposed, and the like). In addition, the job execution screen information 780 stores information necessary to display a job execution screen to be displayed on the display 750 when a job executed by the image forming apparatus 70 is executed.

The communicator 790 communicates with other devices. For example, the communicator 790 is connected to a LAN to transmit and receive a file. In addition to the LAN, which is a general Ethernet, communication such as LTE/4G/5G may be used as a communication method.

4. 3 Flow of Process

Figure 10:
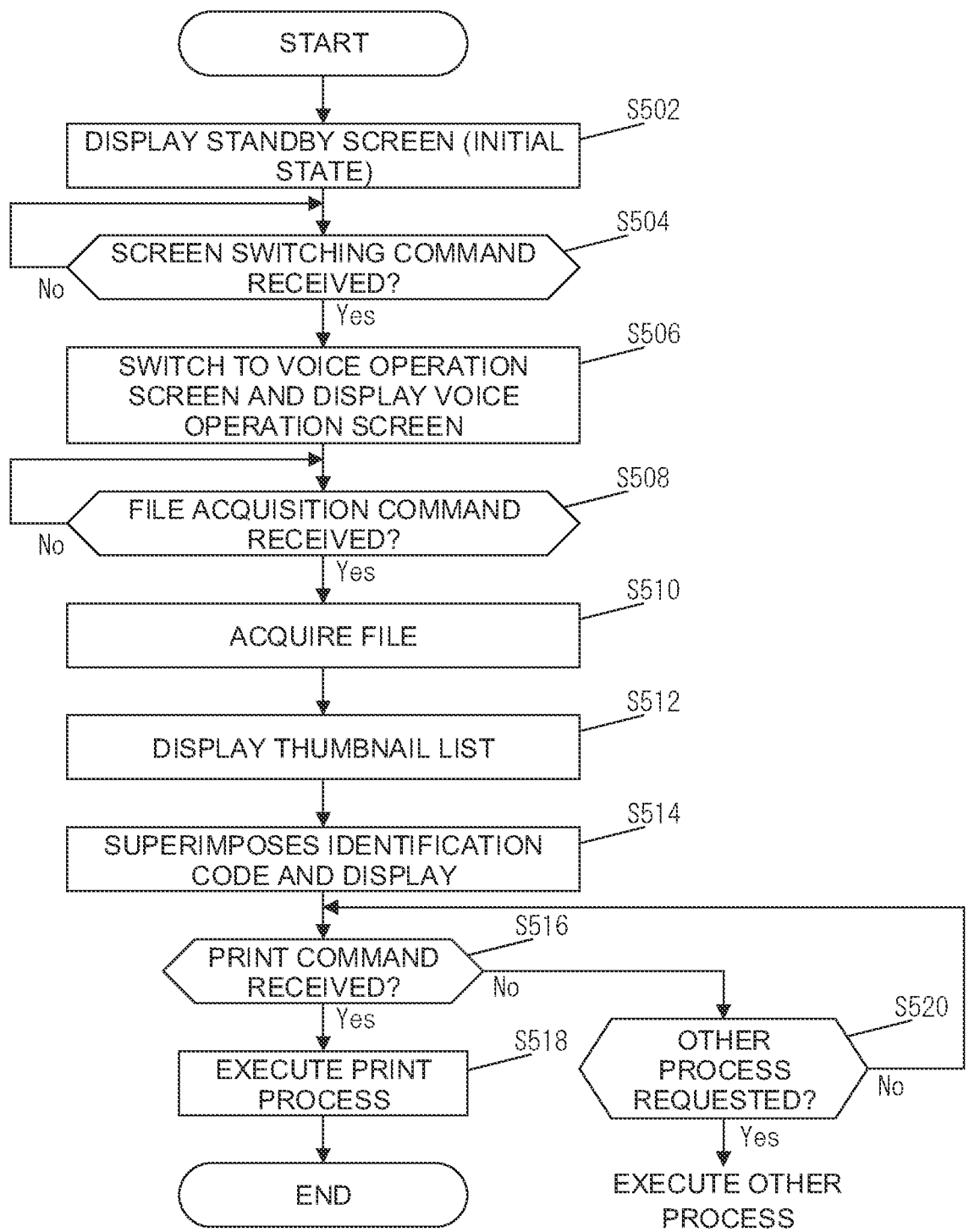
FIG. 10 is a diagram for illustrating a process of the image forming apparatus in the fourth embodiment.

Next, a process in which the image forming apparatus 70 reads and executes a program stored in the storage 770 will be described with reference to FIG. 10. A process illustrated in FIG. 10 is executed by the controller 700 after a user is authenticated by the user authenticator 755.

First, the controller 700 reads the standby screen information 778 as an initial state and displays the standby screen on the display 750 (Step S502).

Subsequently, the controller 700 determines whether or not a screen switching command is received, on the basis of the content of the voice input via the voice inputter/outputter 760 and recognized by the voice recognizer 702 (Step S504). The screen switching command is a command indicating that the input of the operation of the image forming apparatus 70 is switched to a screen to be performed by voice. The screen switching command is, for example, a command by voice including a specific word (wake word) such as "Operate by voice".

In a case where the voice switching command is received, the controller 700 switches the standby screen displayed on the display 750 to a voice operation screen and displays the voice operation screen (Yes in Step S504, Step S506). The voice operation screen is a screen that includes the content of a command capable of being input by voice.

The controller 700 determines whether or not a file acquisition command is received, on the basis of the content of the voice input via the voice inputter/outputter 760 and recognized by the voice recognizer 702 (Step S508). The file acquisition command is a voice command for instructing to acquire the file stored in the file storage area 772, and is, for example, a voice command such as "Display jobs" or "Release my jobs".

In a case where the file acquisition command is received, the controller 700 acquires the file stored in the file storage area 772 (Yes in Step S508, Step S510). At this time, the controller 700 may acquire only the file which an authenticated user can print.

Subsequently, the controller 700 displays a list of thumbnail images of the acquired file on the display 750 (Step S512). Further, the controller 700 assigns an identification code to the acquired file, superimposes the image including the identification code on the thumbnail image of the file corresponding to the identification code, and displays the superimposed images (Step S514). Thus, the controller 700 displays the thumbnail image of the file and the image including the identification code when the file acquisition command is received. Therefore, in this embodiment, the file acquisition command corresponds to the command for displaying a list.

The image including the identification code is, for example, a rectangular image in which a predetermined color is used as a background color and an identification code is superimposed on the background. The size of the image including an identification code is at least one-third of a short side of the thumbnail image. In addition, the image including the identification code may be a non-transparent image, or may be a semi-transparent image in which the identification code is transmitted such an extent that the identification code can be identified by the user. The controller 700 superimposes the image including the identification code on any corner of the thumbnail image and displays the superimposed images.

Subsequently, the controller 700 determines whether or not a print command is received (Step S516). The print command is a command indicating that printing is performed by forming an image based on a file by the image former 730. The print command is, for example, a command by voice including at least an identification code such as "Five" or "Print number five". The controller 700 determines whether or not a print command is received, on the basis of the content of the voice input via the voice inputter/outputter 760 and recognized by the voice recognizer 702.

In a case where the print command is received, a print process is executed by forming an image of a file corresponding to the identification code included in the print command by the image former 730 (Yes in Step S516, Step S518). In a case where printing cannot be performed immediately after the print command is received, the controller 700 may store information for specifying the file corresponding to the identification code in the print file list 774. Further, when the print process is executed, the controller 700 may read the job execution screen information 780 and display a screen related to a print job to be executed on the display 750.

In a case where a command other than the print command is received in Step S516, it is determined whether or not the received command receives a command indicating that a process other than printing is to be performed (No in Step S516, Step S520). In a case where the command indicating that other process is to be performed is received, the controller 700 executes the other process on the basis of the received command (Step S520; Yes). In a case where the command indicating that other process is to be performed is not received, the controller 700 transitions the process to Step S516 again (No in Step S520, Step S516).

4. 4 Operation Example

Figure 11A:
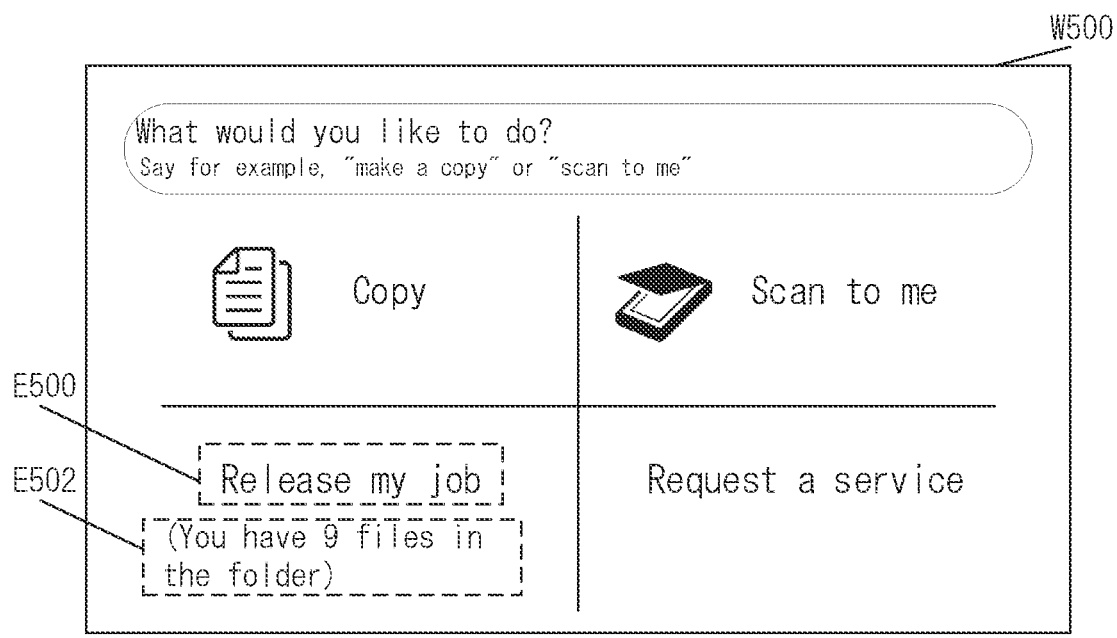
FIGS. 11A and 11B are diagrams for illustrating an operation example in the fourth embodiment.

Subsequently, an operation example of this embodiment will be described with reference to FIGS. 11A, 11B, and FIGS. 12A to 12F. FIG. 11A is an example of a display screen W500 of the voice operation screen. The display screen W500 includes an area E500 where the content of voice uttered by a user (for example, "Release my job") is displayed in order to input the file acquisition command. The user confirms the content displayed in the area E500 and the like, and inputs a command by voice. The display screen W500 may include an area E502 where the number of files that can be printed by the authenticated user is displayed.

Figure 11B:
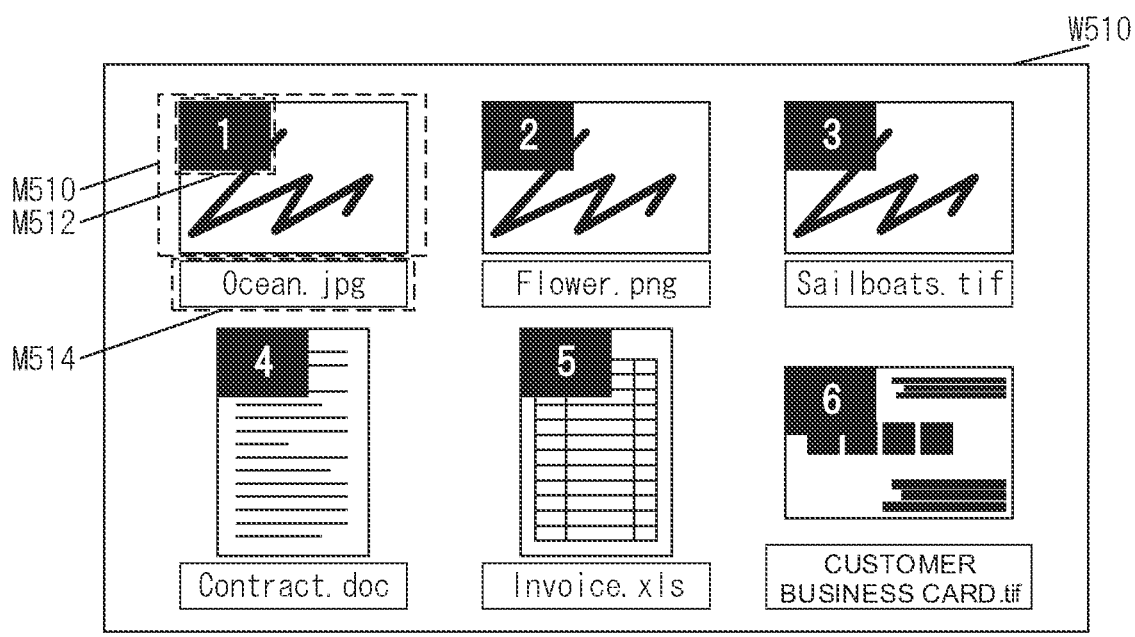

FIG. 11B is an example of a display screen W510, which is a screen in which a thumbnail image is displayed, and in which an image including an identification code is displayed so as to be superimposed on the thumbnail image. For example, as illustrated in FIG. 11B, on the display screen W510, an image M512 including an identification code is displayed in the left corner of a thumbnail image M510. In addition to the thumbnail image and the identification code, a file name M514 may be displayed in the vicinity of the thumbnail image.

Figure 12A:
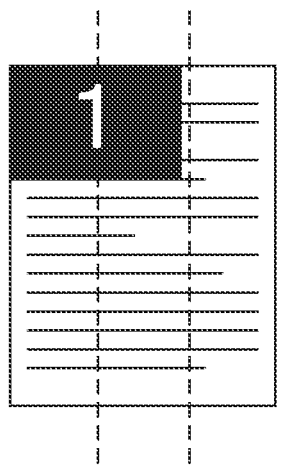
FIGS. 12A to 12F are diagrams for illustrating an operation example in the fourth embodiment.
Figure 12B:
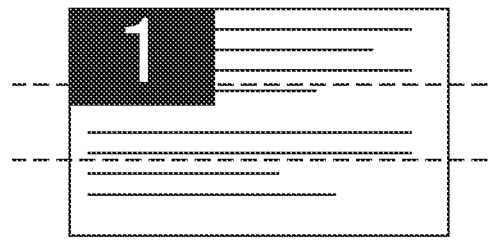

FIGS. 12A to 12F are diagrams illustrating a display example of the image including the identification code. For example, as illustrated in FIG. 12A, in a case where the thumbnail image is vertically long, the image including the identification code is displayed such that the length of the long side of the image including the identification code is one-third or more of the length of the horizontal side which is the short side of the thumbnail image. Further, as illustrated in FIG. 12B, in a case where the thumbnail image is horizontally long, the image including the identification code is displayed such that the length of the short side of the image including the identification code is one-third or more of the length of the vertical side which is the short side of the thumbnail image. Thus, the image including the identification code becomes an image having the size of one-third or more of at least the short side of the thumbnail image, and the identification code can be easily confirmed by the user.

Figure 12C:
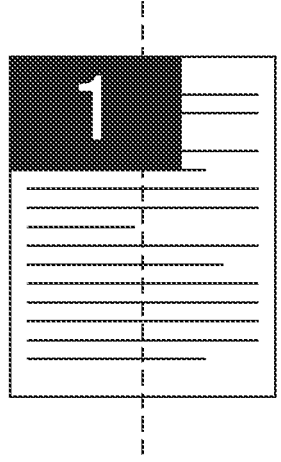

In a case where the thumbnail image is vertically long, the length of the long side of the image including the identification code may be preferably at least half of the short side of the thumbnail image in the image including the identification code, as illustrated in FIG. 12C.

Figure 12D:
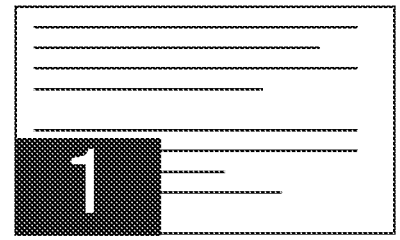
Figure 12E:
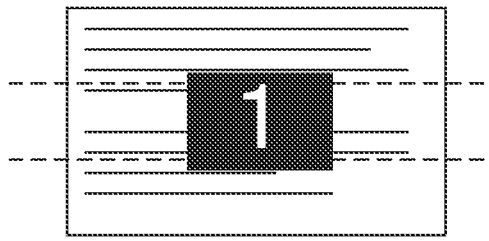

The image including an identification code may be displayed in any corner of the thumbnail image. For example, the image including the identification code may be displayed in the lower left as illustrated in FIG. 12D, or may be displayed in the upper right or lower right. Furthermore, the image including the identification code may be displayed in the center of the thumbnail as illustrated in FIG. 12E. Even in this case, the image including the identification code is an image that is one-third or more of the short side of the thumbnail image.

Figure 12F:
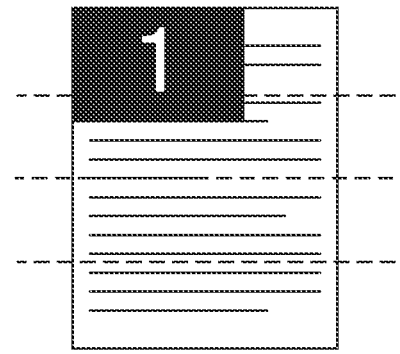

In addition, the image including the identification code may be on the basis of the long side even in a case where the thumbnail image is vertically long. For example, as illustrated in FIG. 12F, the image including the identification code may be displayed such that the length of the short side of the image including the identification code is one-fourth or more of the length of the long side of the thumbnail image.

Thus, various display methods can be considered for the image including the identification code, but the display method may be set in advance or may be set by a user.

As described above, according to this embodiment, the image forming apparatus can display the list of the thumbnail images of the stored file together with the identification codes to be uttered by the user, when the file acquisition command is received from the user. In addition, the image forming apparatus can execute printing on the basis of the print command in a case where the voice including an identification code is uttered as a print command by the user. Consequently, the user can make the image forming apparatus print a desired file simply by uttering voice including an identification code.

5. Fifth Embodiment

Next, a fifth embodiment will be described. In the fifth embodiment, in addition to the process described in the fourth embodiment, a process in which the image forming apparatus sequentially selects one thumbnail image from thumbnail images displayed in a list, and an identification code corresponding to the selected thumbnail image is output by voice from the voice inputter/outputter is executed. In this embodiment, FIG. 10 of the fourth embodiment is replaced with FIG. 13. The same functional sections and processes are given the same reference numerals, and description are omitted.

Figure 13:
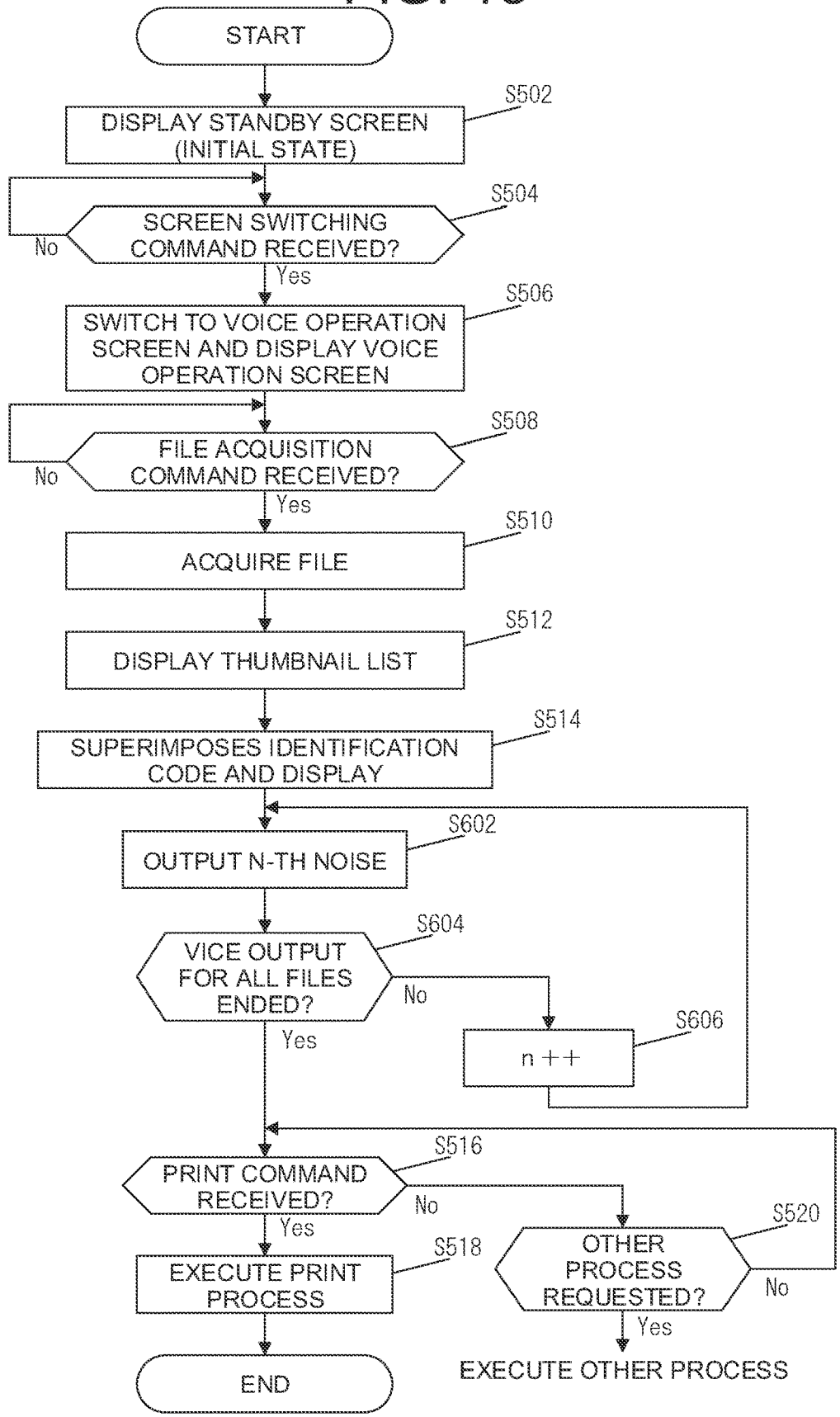
FIG. 13 is a diagram for illustrating a process of an image forming apparatus in a fifth embodiment.

A process in which an image forming apparatus 70 reads out and executes a program stored in a storage 770 will be described with reference to FIG. 13. In this embodiment, a controller 700 executes processes of Step S512 and Step S514 to display a thumbnail image and an identification code on a display 750, and thereafter uses a variable n with 1 as an initial value to sequentially select a thumbnail image from an n-th thumbnail image. Then, the controller 700 outputs voice including an identification code assigned to a file corresponding to the selected n-th thumbnail image via the voice inputter/outputter 760 (Step S602). In addition to the identification code, the voice including an identification code may include information such as a file name, the type of the file, and the creation date and time.

When one thumbnail image is selected, the controller 700 may make a display method for the selected one thumbnail image and an image including an identification image superimposed and displayed on the selected thumbnail image different from other thumbnail images and images including identification images superimposed and displayed on the other thumbnail images. Thus, the controller 700 links the identification code output by voice with the thumbnail image corresponding to the identification code and the image including the identification image.

For example, when one thumbnail image is selected, the controller 700 displays the thumbnail image as follows, in order to display (highlight) the selected thumbnail image by a method different from the display method for other thumbnail images.
(1) Enlarge the selected thumbnail image
(2) Display a frame around the selected thumbnail image
(3) Blink the selected thumbnail image
(4) Invert the color of the selected thumbnail image
(5) Superimpose a predetermined color (for example, red) on the selected thumbnail image in a semi-transparent state
(6) Increase the transmittance of thumbnail images other than the selected thumbnail image to make the thumbnail images less noticeable than the selected thumbnail image.

The controller 700 may display the image as follows in order to highlight the image including the identification code corresponding to the selected thumbnail image instead of the selected thumbnail image.
(1) Enlarge the image including the identification code
(2) Display a frame around the image including the identification code
(3) Change the background color of the image including the identification code
(4) Blink and display the image including the identification code Thus, the controller 700 highlights only the image including the identification code, so that the thumbnail image is not enlarged and other thumbnail images are not hidden, and visibility can be ensured.

The controller 700 may combine two or more display methods of the aforementioned display methods. For example, the selected thumbnail image and the identification code corresponding to the selected thumbnail image may be enlarged and displayed. In addition, the controller 700 may highlight and display a thumbnail image or an image including an identification code by a display method other than the aforementioned display method.

Further, when the n-th voice output in the Step S602 is completed, the controller 700 returns the display of the highlighted n-th thumbnail image and the highlighted image including the identification code to an original (before highlighting) display mode.

Subsequently, the controller 700 determines whether or not the voice output of the identification code for all the files is completed (Step S604). In a case where the voice output of the identification code for all files is not completed, 1 is added to n and the process returns to Step S602 (Step S604; No, Step S606, Step S602). Thus, the controller 700 can output the identification code by voice for all the files.

The controller 700 does not determine whether or not a print command is received after the voice output of the identification code for all the files is completed, but may determine whether or not the print command is received during output of the voice identification code. In this case, when the controller 700 receives the print command, the output of the identification code by voice is completed, and the controller 700 executes the print process of the file corresponding to the identification code included in the print command. Thus, the user can input the print command immediately after confirming the identification code corresponding to the file desired to be printed.

Figure 14A:
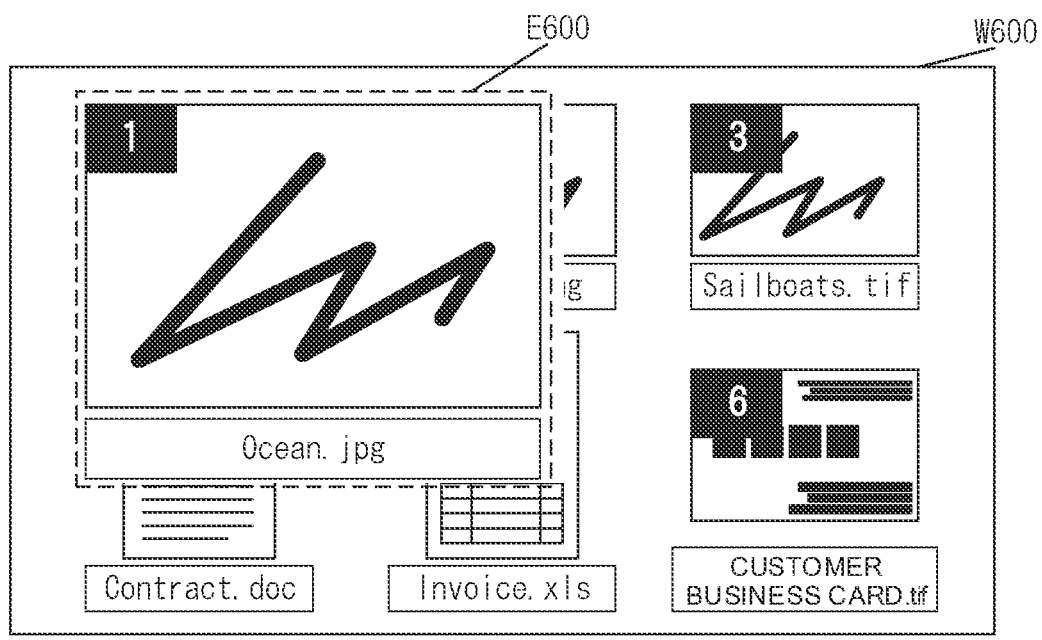
FIGS. 14A and 14B are diagrams for illustrating an operation example in the fifth embodiment.

An operation example in this embodiment will be described with reference to FIGS. 14A and 14B. FIG. 14A is an example of the display screen W600 when a first thumbnail image is selected and the thumbnail image is enlarged and displayed. An area E600 of the display screen W600 includes the enlarged first thumbnail image, an image including an identification code, and a file name. At this time, the voice including the identification code (for example, voice such as "Number one, Ocean.jpg") is output via the voice inputter/outputter 760. The file name is output by voice according to predetermined reading.

Figure 14B:
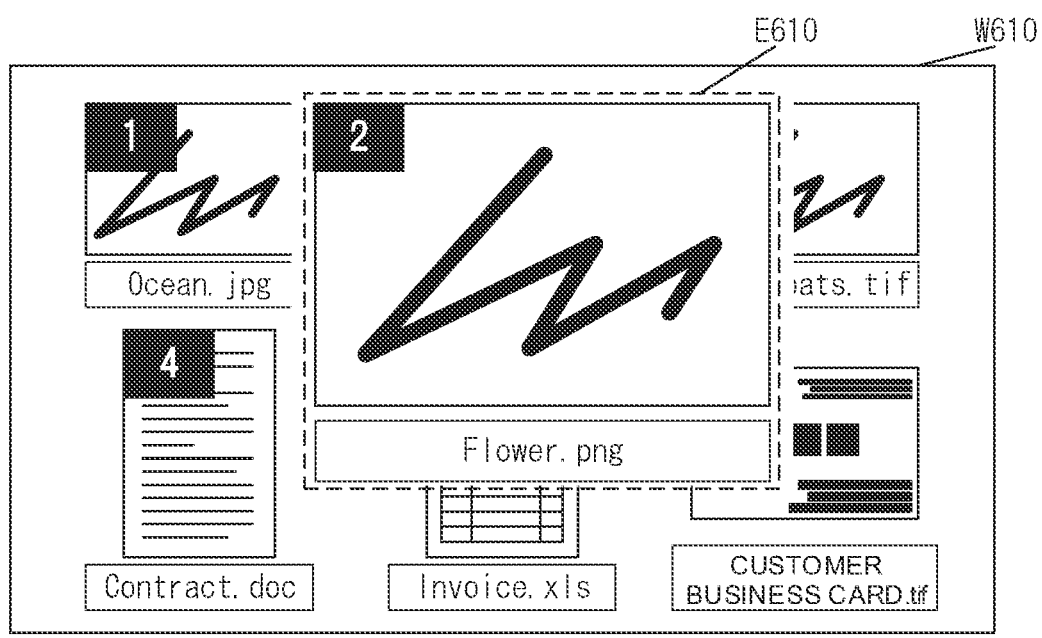

FIG. 14B is an example of a display screen W610 when a second thumbnail image is selected and the thumbnail image is enlarged and displayed. An area E610 of the display screen W610 includes the enlarged second thumbnail image, an image including an identification code, and a file name. At this time, the voice including the identification code (for example, the voice such as "Number two, Flower.png") is output via the voice inputter/outputter 760.

In the same manner, third to sixth thumbnail images are sequentially selected, enlarged and displayed, and voice including each identification code is output via the voice inputter/outputter 760.

According to this embodiment, the user can appropriately select a file desired for printing by checking voice output from the voice inputter/outputter and a screen displayed on the display.

6. Modification

The present invention is not limited to the aforementioned embodiments, and various modifications can be made. That is, the technical scope of the present invention also includes embodiments obtained by combining technical means appropriately modified without departing from the gist of the present invention.

In addition, although the aforementioned embodiments are described separately for convenience of explanation, it is needless to say that the embodiments may be combined and executed within the technically possible range. For example, the second embodiment and the fifth embodiment may be combined. In this case, the display device 60 in the second embodiment displays a list of files and identification codes, and then outputs sound including the identification code via the voice inputter/outputter 530.

In addition, a program that operates in each device in the embodiment is a program that controls the CPU and the like (a program that functions the computer) so as to realize the functions of the aforementioned embodiment. Then, the information handled by these devices is temporarily stored in a temporary storage device (for example, RAM) at the time of processing, and then stored in various storage devices such as a ROM (Read Only Memory) and an HDD, and read, modified and written by the CPU as needed.

Herein, the recording medium for storing the program may be any of a semiconductor medium (such as a ROM and a non-volatile memory card), an optical recording medium/magneto-optical recording medium (for example, DVD (digital versatile disc), an MO (magneto optical), an MD (mini disc), a CD (compact disc), a BD (Blu-ray Disc), etc.), a magnetic recording medium (such as a magnetic tape and a flexible disc), and the like. In addition, not only the functions of the aforementioned embodiments are realized by executing the loaded program, but also the functions of the present invention are sometimes realized by processing in collaboration with an operating system or other application programs on the basis of the instruction of the program.

In addition, when distributing to the market, the program can be stored in a portable recording medium and distributed, or transferred to a server computer connected via a network such as an internet. In this case, it goes without saying that the storage device of the server computer is also included in the present invention.

What is claimed is:

1. A system comprising:
   a control device;
   a storage device that stores a file;
   a display device; and
   a voice device, wherein the control device displays a list of first identification display for specifying the file which is registered by a user on the display device,
   the control device starts a voice recognition control function based on an operation by the user after displaying the first identification display,
   in response to the operation:
      the control device assigns an identification code to the file displayed in the list,
      the control device displays second identification display based on the identification code which is assigned, the second identification display being displayed corresponding to the first identification display displayed in the list, and
   the control device selects the file corresponding to the identification code when voice including the identification code is input from the user via the voice device.

2. The system according to claim 1, wherein
   when the control device displays the list of the first identification display on the display device, the control device receives input of the voice including the identification code from the user only in a case where the user is able to select the file from the first identification display displayed in the list.

3. The system according to claim 1, wherein
   the control device is able to execute a predetermined process,
   the control device is able to display a list of the first identification display and the second identification display on the display device, when the predetermined process is executed, and
   the control device selects the file corresponding to the identification code, when the voice including the identification code is input from the user via the voice device while the predetermined process is being executed.

4. The system according to claim 3, wherein
   the predetermined process is a conference process in which a plurality of users are able to participate.

5. The system according to claim 1, wherein
   in a case where voice is input from the user via the voice device and the first identification display is displayed in the list, the control device receives input of the identification code from the voice device, and
   in a case where input is made from the user via a device other than the voice device and the first identification display is displayed in the list, the control device receives input from the device other than the voice device.

6. The system according to claim 1, wherein
   the first identification display is an icon indicating a file name and an attribute of the file.

7. The system according to claim 1 wherein
   the control device groups the files to be displayed in the list, and assigns one identification code to a plurality of the files included in the same group.

8. The system according to 1, wherein
   the control device does not receive an input of the voice by the user when the control device only displays the first identification display on the display device.

* * * * *